(12) United States Patent
Maeda (10) Patent No.: US 9,462,146 B2
(45) Date of Patent: Oct. 4, 2016

(54) SHEET CONVEYING DEVICE CAPABLE OF DISCHARGING SHEET FROM CONVEYING PATH AT STARTUP

(71) Applicant: Takashi Maeda, Nagoya (JP)

(72) Inventor: Takashi Maeda, Nagoya (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 14/015,153

(22) Filed: Aug. 30, 2013

(65) Prior Publication Data

US 2014/0063518 A1    Mar. 6, 2014

(30) Foreign Application Priority Data

Aug. 31, 2012   (JP) ................................. 2012-191593

(51) Int. Cl.
| | |
|---|---|
| *G06K 15/00* | (2006.01) |
| *H04N 1/00* | (2006.01) |
| *G06K 15/16* | (2006.01) |
| *B65H 29/00* | (2006.01) |
| *B65H 43/00* | (2006.01) |
| *H04N 1/32* | (2006.01) |

(52) U.S. Cl.
CPC .......... *H04N 1/00591* (2013.01); *B65H 29/00* (2013.01); *B65H 43/00* (2013.01); *G06K 15/16* (2013.01); *H04N 1/32667* (2013.01); *B65H 2511/20* (2013.01); *B65H 2557/23* (2013.01); *B65H 2801/39* (2013.01); *H04N 1/00657* (2013.01); *H04N 2201/0081* (2013.01)

(58) Field of Classification Search
None
See application file for complete search history.

(56) References Cited

U.S. PATENT DOCUMENTS

| | | | |
|---|---|---|---|
| 2004/0141215 A1 | 7/2004 | Sugawara | |
| 2008/0018958 A1* | 1/2008 | Kurokawa | ............... H04N 1/12 358/474 |
| 2011/0241289 A1* | 10/2011 | Yamamoto | ........... B41J 13/0009 271/264 |
| 2012/0019852 A1* | 1/2012 | Ito | ........................ G06K 15/027 358/1.13 |

FOREIGN PATENT DOCUMENTS

| | | | |
|---|---|---|---|
| JP | 2004-228611 A | | 8/2004 |
| JP | 2006-217514 A | | 8/2006 |
| JP | 2012-063457 A | | 3/2012 |
| JP | 2012063457 A | * | 3/2012 |
| JP | 2012063457 A | * | 3/2012 |

* cited by examiner

*Primary Examiner* — Vincent Rudolph
*Assistant Examiner* — Richa Mishra
(74) *Attorney, Agent, or Firm* — Scully, Scott, Murphy & Presser, P.C.

(57) ABSTRACT

A sheet conveying device includes: a conveying unit; a nonvolatile memory; and a controller. The conveying unit is configured to convey a sheet along a conveying path. The controller is configured to control the conveying unit to convey the sheet, store position data in the nonvolatile memory during conveyance of the sheet, determine whether or not the sheet conveying device is started, and drive the conveying unit for an amount determined by the position data if the sheet conveying device is started. The conveying path is divided into a plurality of segments. The position data identifies a segment in which the sheet stays. The more downstream the segment identified by the position data is in the conveying path, the smaller the amount determined by the position data is.

7 Claims, 6 Drawing Sheets

SHEET CONVEYING DEVICE CAPABLE OF DISCHARGING SHEET FROM CONVEYING PATH AT STARTUP

CROSS REFERENCE TO RELATED APPLICATION

This application claims priority from Japanese Patent Application No. 2012-191593 filed Aug. 31, 2012. The entire content of the priority applications is incorporated herein by reference.

TECHNICAL FIELD

The present invention relates to a sheet conveying device and an image processing device, and particularly to a technique used by the sheet conveying device and the image processing device to convey sheets along its conveying path.

BACKGROUND

One method used in conventional image-processing devices to ensure that a sheet present on the conveying path is properly discharged in such situations is to always rotate the conveying rollers a fixed amount when the operating state of the device stored in the nonvolatile memory indicates that the device was in the process of executing a reading operation. However, a device having this construction does not know the last position of the sheet before the power was interrupted. Therefore, the device must rotate the conveying rollers the maximum distance required to discharge a sheet from the conveying path when the sheet is positioned near the entrance to the conveying path in order to reliably discharge a sheet positioned anywhere along the conveying path. Consequently, when the sheet is positioned closer to the exit of the conveying path, for example, the conveying rollers will continue to be rotated unnecessarily after the sheet has been discharged.

SUMMARY

In view of the foregoing, it is an object of the present invention to provide a technique for minimizing wasteful driving by the conveying unit of a sheet conveying device and an image processing device when discharging a sheet from the conveying path at startup as an improvement over devices configured to drive the conveying unit the maximum distance needed to discharge a sheet positioned anywhere along the conveying path.

In order to attain the above and other objects, the present invention provides a sheet conveying device comprising: a conveying unit; a nonvolatile memory; and a controller. The conveying unit is configured to convey a sheet along a conveying path. The controller is configured to: control the conveying unit to convey the sheet; store position data in the nonvolatile memory during conveyance of the sheet; determine whether or not the sheet conveying device is started; and drive the conveying unit for an amount determined by the position data if the sheet conveying device is started. The position data is related to a conveyed position of the sheet along the conveying path. The conveying path is divided into a plurality of segments. The position data identifies a segment in which the sheet stays. The more downstream the segment identified by the position data is in the conveying path, the smaller the amount determined by the position data is.

According to another aspect, the present invention provides a sheet conveying device comprising: a conveying unit; a nonvolatile memory; and a controller. The conveying unit is configured to convey a sheet along a conveying path. The controller is configured to: control the conveying unit to convey the sheet; store position data in the nonvolatile memory during conveyance of the sheet; and drive the conveying unit to convey the sheet a conveying distance based on the position data when the conveyance of the sheet is resumed. The position data is related to a conveyed position of the sheet along the conveying path.

According to still another aspect, the present invention provides an image processing device comprising: a conveying unit; an image processing unit; a nonvolatile memory; and a controller. The conveying unit is configured to convey a sheet along a conveying path. The image processing unit is configured to perform image processing for the sheet at a process position. The controller is configured to: control both the conveying unit to convey the sheet and the image processing unit to perform the image processing for the sheet that is conveyed by the conveying unit; store position data in the nonvolatile memory during conveyance of the sheet; and drive the conveying unit to convey the sheet a conveying distance determined based on the position data when the conveyance of the sheet is resumed. The position data is indicative of where the sheet has been conveyed to in the conveying path.

BRIEF DESCRIPTION OF THE DRAWINGS

The particular features and advantages of the invention as well as other objects will become apparent from the following description taken in connection with the accompanying drawings, in which.

DETAILED DESCRIPTION

A sheet-conveying device and an image-processing device according to embodiment of the present invention will be described while referring to the accompanying drawings wherein like parts and components are designated by the same reference numerals to avoid duplicating description.

Next, a preferred embodiment of the present invention will be described with reference to FIGS. 1 through 6. In the preferred embodiment, a multifunction peripheral 1 serves as the image-processing device of the present invention that includes the sheet-conveying device of the present invention. The multifunction peripheral 1 according to the preferred embodiment can implement a scan mode, as well as a copy mode and a print mode, for example. In the following description, the lower right side of the multifunction peripheral 1 in FIG. 1 will be referred to as the front side ("F" in the drawings), the lower left side as the left side ("L" in the drawings), and the top as the upper side ("U" in the drawings).

Mechanical Structure of the Multifunction Peripheral

Figure 1:
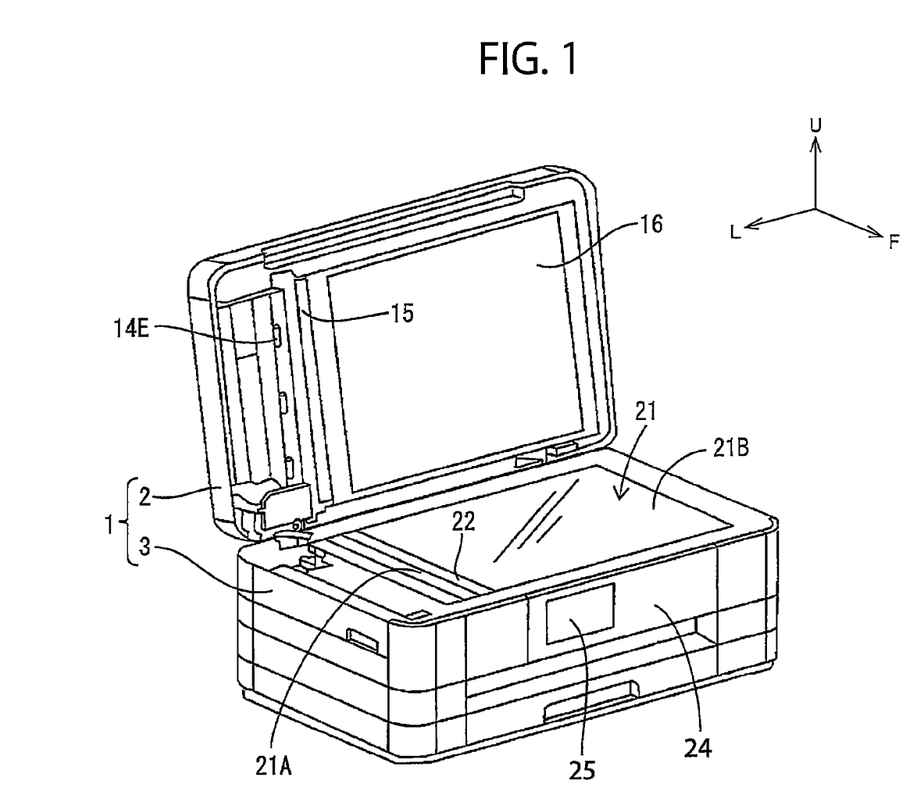
FIG. 1 is a perspective view illustrating an appearance of a multifunction peripheral according to one embodiment.

As shown in FIG. 1, the multifunction peripheral 1 includes a cover 2, and a device body 3. Support members (not shown) are provided on the top surface of the device body 3 at the rear edge thereof. Through the support members, the rear edge of the cover 2 is connected to the device body 3 so as to be capable of pivotally move about an axis oriented in the left-right direction. This configuration allows the cover 2 to be displaced between a closed position for covering the top surface of the device body 3, and an open position (shown in FIG. 1) for revealing the top surface of the device body 3.

Figure 2:
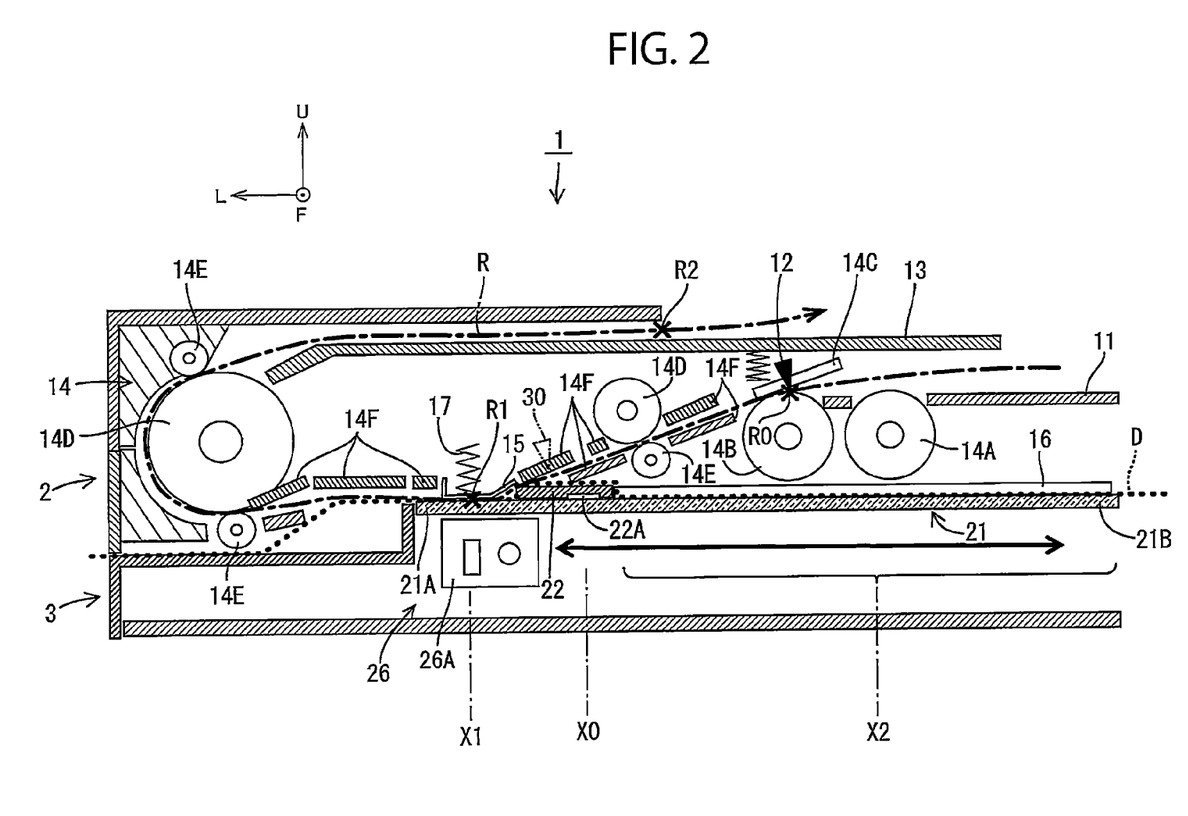
FIG. 2 is a cross-sectional view illustrating a configuration of a portion of a cover and a device body.

In FIG. 2, the portion of the multifunction peripheral 1 above the dotted line D represents the cover 2. The cover 2 includes a feed tray 11, a front sensor 12, a discharge tray 13, an automatic-document feeder (ADF) 14, an ADF pressing plate 15, and a flatbed pressing plate 16.

The feed tray 11 supports a plurality of sheets M of originals (see FIG. 5) to be scanned. The sheets M may be sheets of paper, plastic transparencies, and the like. The front sensor 12 is disposed at a detection position R0 on the downstream side (left side in FIG. 2) of the feed tray 11 for detecting the presence of sheets M in the feed tray 11, and transmits these detection results to a control unit 27 described later. The discharge tray 13 is disposed above the feed tray 11 and receives sheets M that are discharged from the cover 2 after an image-reading operation. A conveying path R is formed inside the cover 2. The conveying path R is U-shaped and serves to convey the sheets M from the feed tray 11 to the discharge tray 13 while inverting and reversing directions of the conveyed sheets M. A discharge position R2 is the furthest downstream point along the conveying path R.

When a plurality of sheets M is loaded in the feed tray 11, the ADF 14 conveys the sheets M continuously along the conveying path R one sheet at a time and sequentially discharges the sheets onto the discharge tray 13. The ADF 14 includes a feeding roller 14A, a separating roller 14B, a separating pad 14C, a plurality of conveying rollers 14D, a plurality of follow rollers 14E contacting respective conveying rollers 14D with pressure so as to follow the rotation of the conveying rollers 14D, and a plurality of guide members 14F for guiding the conveyed sheets M.

The feeding roller 14A, separating roller 14B, and conveying rollers 14D are driven to rotate by a stepping motor 14G described later. If a plurality of sheets M is loaded in the feed tray 11, the feeding roller 14A conveys the sheets M toward the conveying path R, and the separating roller 14B and separating pad 14C separate and convey the sheets M one sheet at a time onto the conveying path R. The conveying rollers 14D convey the individually separated sheets M along the conveying path R and discharge the same onto the discharge tray 13. The ADF 14 in the preferred embodiment has what is referred to as a one-way clutch and performs a continuous conveying operation from the moment a conveyance start command is received from a control unit 27 described later until a conveyance halt command is received. When a plurality of sheets M is loaded in the feed tray 11, the ADF 14 executes this continuous conveying operation to separate and convey the sheets M one sheet at a time along the conveying path R, with a gap formed between consecutively fed sheets, and to sequentially discharge the sheets onto the discharge tray 13.

The ADF pressing plate 15 is an opposing member that is provided on the bottom surface of the cover 2 via a spring 17. The spring 17 urges the ADF pressing plate 15 toward an ADF glass 21A described later when the cover 2 is in the closed position. Hereinafter, the point at which the ADF pressing plate 15 opposes the ADF glass 21A will be called a read position R1. The flatbed pressing plate 16 is also provided on the bottom surface of the cover 2. The flatbed pressing plate 16 covers substantially an entire flatbed glass 21B described later when the cover 2 is in its closed state.

As shown in FIG. 1, the device body 3 has an overall box-like shape that is elongated in the left-right direction. A platen glass 21 is disposed in the top surface of the device body 3. A partitioning member 22 is provided on the top surface of the platen glass 21 at a position toward the left side thereof. The partitioning member 22 divides the platen glass 21 into two parts. Hereinafter, the left part of the platen glass 21 will be called an ADF glass 21A, and the right part will be called a flatbed glass 21B. A white reference plate 22A is also provided on the bottom surface of the partitioning member 22 (see FIG. 2). The white reference plate 22A is a white-colored member with a substantially uniform reflectance. Portions of the bottom surface of the partitioning member 22 adjacent to the white reference plate 22A are black.

The device body 3 is also provided with a power switch 23 (see FIG. 3), an operating unit 24, a display unit 25, and the like. The user operates the power switch 23 to turn the power to the multifunction peripheral 1 on and off. When the power is on, electricity is supplied from an external power supply, for example, to various components in the cover 2 and device body 3.

As shown in FIG. 2, an image-reading unit 26 is provided inside the device body 3. The image-reading unit 26 is provided with a reading device 26A, and a device-moving mechanism 26B (see FIG. 3). The reading device 26A has a contact image sensor (CIS). Specifically, the reading device 26A includes a light source configured of red, green, and blue light-emitting elements (such as light-emitting diodes), for example; an image sensor having a plurality of light-receiving elements arranged linearly in the front-rear direction (a main scanning direction); an optical system for focusing light reflected off a sheet onto the light-receiving elements of the image sensor; and a carriage for supporting these components. Note that the reading device 26A may be configured of a charge-coupled drive (CCD) image sensor, for example, and is not limited to a CIS.

The device-moving mechanism 26B is configured to move the reading device 26A in a left-right direction (a sub-scanning direction) beneath the ADF glass 21A, partitioning member 22, and flatbed glass 21B. Hereinafter, the position at which the reading device 26A opposes the ADF glass 21A will be called an ADF position X1, the position at which the reading device 26A opposes the partitioning member 22 will be called a home position X0, and the position at which the reading device 26A opposes the flatbed glass 21B will be called a flatbed position X2. The device body 3 also includes a control unit 27, a nonvolatile memory 28, and a printing unit 29 described later (see FIG. 3).

Electrical Structure of the Multifunction Peripheral

Figure 3:
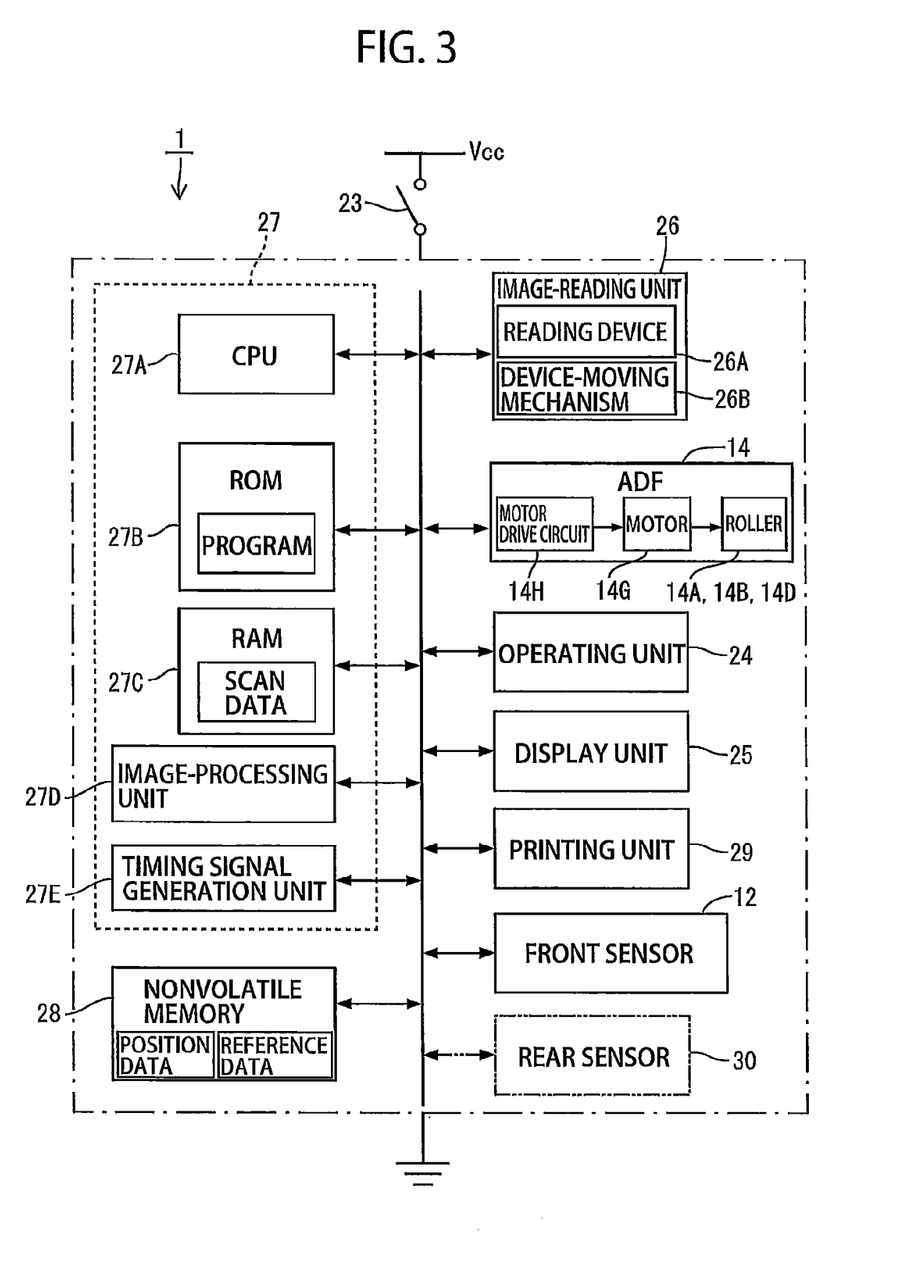
FIG. 3 is a block diagram showing an electrical structure of the multifunction peripheral.

As shown in FIG. 3, the multifunction peripheral 1 includes the power switch 23 and control unit 27. The control unit 27 is connected to and capable of performing data communications with the front sensor 12, ADF 14, image-reading unit 26, operating unit 24, display unit 25, nonvolatile memory 28, and printing unit 29.

The control unit 27 has a central processing unit (CPU) 27A, a ROM 27B, a RAM 27C, an image-processing unit 27D, and a timing signal generation unit 27E. The ROM 27B stores programs for implementing a read control process and a startup process described later, and programs for executing various other operations on the multifunction peripheral 1. The CPU 27A executes the programs read from the ROM 27B to control various components of the multifunction peripheral 1. The programs described above may also be stored on another type of nonvolatile memory, such as a CD-ROM, hard disk drive, or flash memory (registered trademark), instead of the ROM 27B and RAM 27C.

The image-processing unit 27D is a hardware circuit dedicated to image processing and executes shading compensation, gamma correction, and other image processes on scan data that has undergone analog-to-digital conversion. The timing signal generation unit 27E generates a clock signal and outputs this signal to a motor drive circuit 14H described next.

The ADF 14 includes a stepping motor 14G and the motor drive circuit 14H for driving the rollers 14A, 14B, and 14D mentioned above to rotate. The stepping motor 14G has a construction well known in the art that includes a rotor (not shown) fixed to a rotational shaft, and a stator (not shown) mounted around the outside of the rotor. The motor drive circuit 14H functions to drive the stepping motor 14G. By applying an electric current in sequential pulses corresponding to an excitation phase to a coil wound about the stator, the motor drive circuit 14H can accurately rotate the rotor in units of fixed angles. The excitation phase serves to indicate how the motor drive circuit 14H is to supply electric current to the coil of the stepping motor 14G. Thus, the rotated position of the stepping motor 14G (the rotor position) is determined by this excitation phase.

The timing signal generation unit 27E of the control unit 27 inputs a clock signal into the motor drive circuit 14H. The motor drive circuit 14H updates the signal indicating the excitation phase for each pulse of the clock signal and supplies current to the coil based on this signal for rotating the stepping motor 14G one step (prescribed angle) at a time.

The image-reading unit 26 can execute an ADF reading operation and a flatbed reading operation. In the ADF reading operation, the reading device 26A remains stationary at the ADF position X1 while performing an operation to read an image from a sheet M conveyed by the ADF 14. In the flatbed reading operation, the image-reading unit 26 performs an operation to read an image from a sheet M placed stationary on the flatbed glass 21B while the device-moving mechanism 26B moves the reading device 26A along the flatbed glass 21B. The RAM 27C stores scan data for an image read by the reading device 26A. More specifically, the image-reading unit 26 produces scan data for rows of pixels based on the scanned image; an A/D conversion unit (not shown) converts this analog data to a digital form; and the image-reading unit 26 stores the resulting data in the RAM 27C. The image-reading unit 26 serves as a position data producing unit that generates position data described later.

The operating unit 24 includes a plurality of buttons that enable the user to perform various input operations, such as an operation for specifying one of the functional modes described above. The display unit 25 has a liquid crystal display, LED lamps, and the like for displaying various option screens and the operating status of the device, for example. The nonvolatile memory 28 is configured of EEPROM, for example, and is used for storing position data and reference data described later. The printing unit 29 prints an image based on image data, such as the scan data, on a printing sheet (not shown) according to an electrophotographic or inkjet method, for example.

Read Control Process

Figure 4:
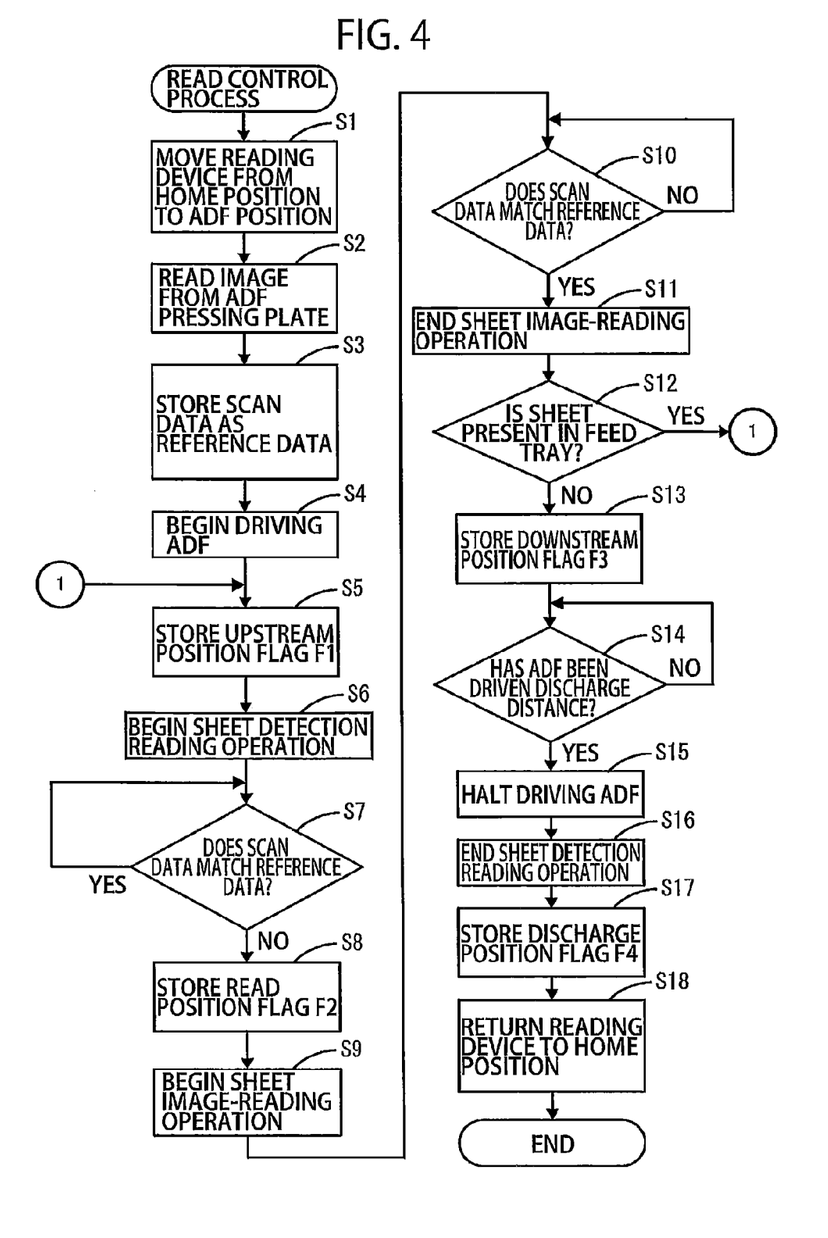
FIG. 4 is a flowchart illustrating steps in a read control process.

If the user performs an operation on the operating unit 24 for specifying implementation of the scan mode, for example, the control unit 27 executes the read control process shown in FIG. 4 only after determining that a sheet M of originals is present in the feed tray 11 based on detection results received from the front sensor 12. In the read control process, the control unit 27 begins conveying a sheet M from the feed tray 11, while executing the ADF reading operation as the sheet M is conveyed. The control unit 27 also performs a process to continuously store in the nonvolatile memory 28 position data related to the conveyed position of the sheet M along the conveying path R.

Prior to executing the read control process, the CPU 27A of the control unit 27 controls the device-moving mechanism 26B to move the reading device 26A to the home position X0. Specifically, the CPU 27A begins moving the reading device 26A and determines that the reading device 26A has arrived at the home position X0 when the image read by the reading device 26A changes from a white image representing the white reference plate 22A to a black image representing a part of the partitioning member 22 adjacent to the white reference plate 22A. Upon determining that the reading device 26A has arrived at the home position X0, the control unit 27 halts the device-moving mechanism 26B.

In S1 of FIG. 4, the CPU 27A of the control unit 27 controls the device-moving mechanism 26B to move the reading device 26A from the home position X0 to the ADF position X1. In S2 the CPU 27A controls the reading device 26A to read an image from the opposing surface of the ADF pressing plate 15 and acquires the resulting scan data. Here, it is preferable that the opposing surface of the ADF pressing plate 15 has a color such as gray that is distinguishable from the color of the sheets of originals or has an image that is distinguishable from images on the sheets. In S3 the CPU 27A stores the scan data acquired in S2 in the nonvolatile memory 28 as reference data.

Figure 5:
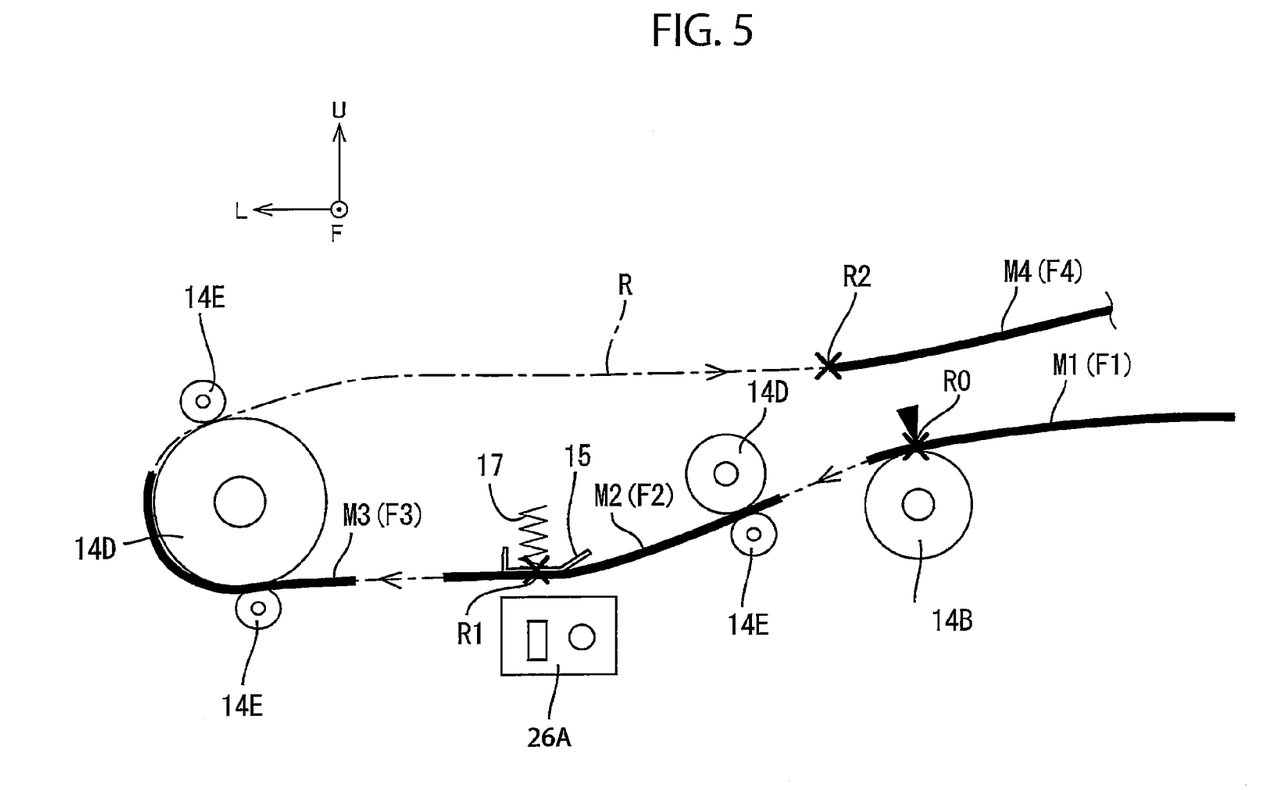
FIG. 5 is an explanatory diagram showing a sheet-conveying process in a conveying path.

After the reference data has been stored in the nonvolatile memory 28, in S4 the CPU 27A begins driving the ADF 14, whereby a sheet M is conveyed onto the conveying path R, as illustrated in FIG. 5. At this time, the leading edge of the sheet M is positioned between the detection position R0 and read position R1, as is represented by sheet M1 in FIG. 5. Hence, in S5 the CPU 27A stores an upstream position flag F1 in the nonvolatile memory 28 as the current position data, where the upstream position flag F1 indicates that the sheet M is in a position upstream of the read position R1.

After the upstream position flag F1 is stored in the nonvolatile memory 28, in S6 at least one of the CPU 27A and image-processing unit 27D initiates a reading operation for detecting the sheet (hereinafter referred to as a sheet detection reading operation). The sheet detection reading operation is a process for detecting whether the sheet M is present at the read position R1 based on scan data received from the reading device 26A. That is, if a sheet M is not present at the read position R1, then the reading device 26A will read the opposing surface of the ADF pressing plate 15. In this case, the scan data received from the reading device 26A will match the reference data. However, if a sheet M is present at the read position R1, the reading device 26A reads the sheet M rather the opposing surface of the ADF pressing plate 15 and, hence, the scan data received from the reading device 26A will not match the reference data.

In S7 the control unit 27 sequentially acquires scan data from the reading device 26A and determines whether this scan data matches the reference data. In this case, the control unit 27 determines that the scan data matches the reference data when one of the image color, pixel value, and color difference in an image based on the scan data matches that in the image based on the reference data, for example. Further, the term "match" in this case is not limited to cases in which the images based on both the scan data and reference data match each other completely, but also includes cases in which the images essentially match, i.e., are within a prescribed range of each other.

When the determination results in S7 change from indicating that the scan data matches the reference data to indicating the scan data does not match the reference data (S7: NO), then the leading edge of the sheet M has arrived at the read position R1. Accordingly, in S8 the control unit 27 stores a read position flag F2 in the nonvolatile memory 28 as the current position data, where the read position flag F2 indicates that the sheet M is present at the read position R1, as is represented by sheet M2 in FIG. 5.

In S9 at least one of the CPU 27A and image-processing unit 27D begins a sheet image-reading operation triggered by the timing at which the scan data no longer matches the reference data. The sheet image-reading operation is an operation for reading an image from the sheet M based on scan data received from the reading device 26A and storing the scan data for the image in the RAM 27C, for example. Subsequently, in S10 the control unit 27 determines based on the sheet detection reading operation whether the determination results have changed from indicating the scan data does not match the reference data to indicating the scan data matches the reference data. When the determination results change in this way (S10: YES), in S11 the control unit 27 ends the sheet image-reading operation. In S12 the CPU 27A determines whether a sheet M is present in the feed tray 11 based on detection results received from the front sensor 12.

If the control unit 27 determines that a sheet M is present in the feed tray 11 (S12: YES), the control unit 27 returns to S5 and stores the upstream position flag F1 in the nonvolatile memory 28 as the current position data indicating that the sheet M is positioned between the detection position R0 and read position R1. However, if the control unit 27 determines that a sheet M is not present in the feed tray 11 (S12: NO), then the sheet image-reading operation has been performed on all sheets M of originals that were loaded in the feed tray 11. Accordingly, in S13 the control unit 27 stores a downstream position flag F3 in the nonvolatile memory 28 as the current position data, whereby the downstream position flag F3 indicates that the sheet M is positioned downstream of the read position R1, as is represented by sheet M3 in FIG. 5.

Triggered by the determination in S10 that the scan data matches the reference data, in S14 the CPU 27A begins driving the ADF 14 to rotate exactly a discharge distance. Once the ADF 14 has been driven the discharge distance (S14: YES), in S15 the CPU 27A halts the ADF 14 and in S16 the control unit 27 ends the sheet detection reading operation. The discharge distance is at least equivalent to the distance from the read position R1 to the discharge position R2. The CPU 27A determines that the ADF 14 has been driven to rotate the discharge distance by counting the elapsed time from the determination timing in S10 or the number of steps by which the motor drive circuit 1411 drives the stepping motor 14G from the same point, for example. When the count value reaches a value corresponding to the discharge distance, the CPU 27A halts the ADF 14.

In S17 the CPU 27A stores a discharge position flag F4 in the nonvolatile memory 28 as the current position data, whereby the discharge position flag F4 indicates that the sheet M is present at the discharge position R2, as is represented by sheet M4 in FIG. 5. Note that the control unit 27 may execute the process in S17 prior to the processes in S15 or S16. In S18 the CPU 27A controls the device-moving mechanism 26B to return the reading device 26A from the ADF position X1 to the home position X0, and the control unit 27 ends the current read control process.

Startup Process

Figure 6:
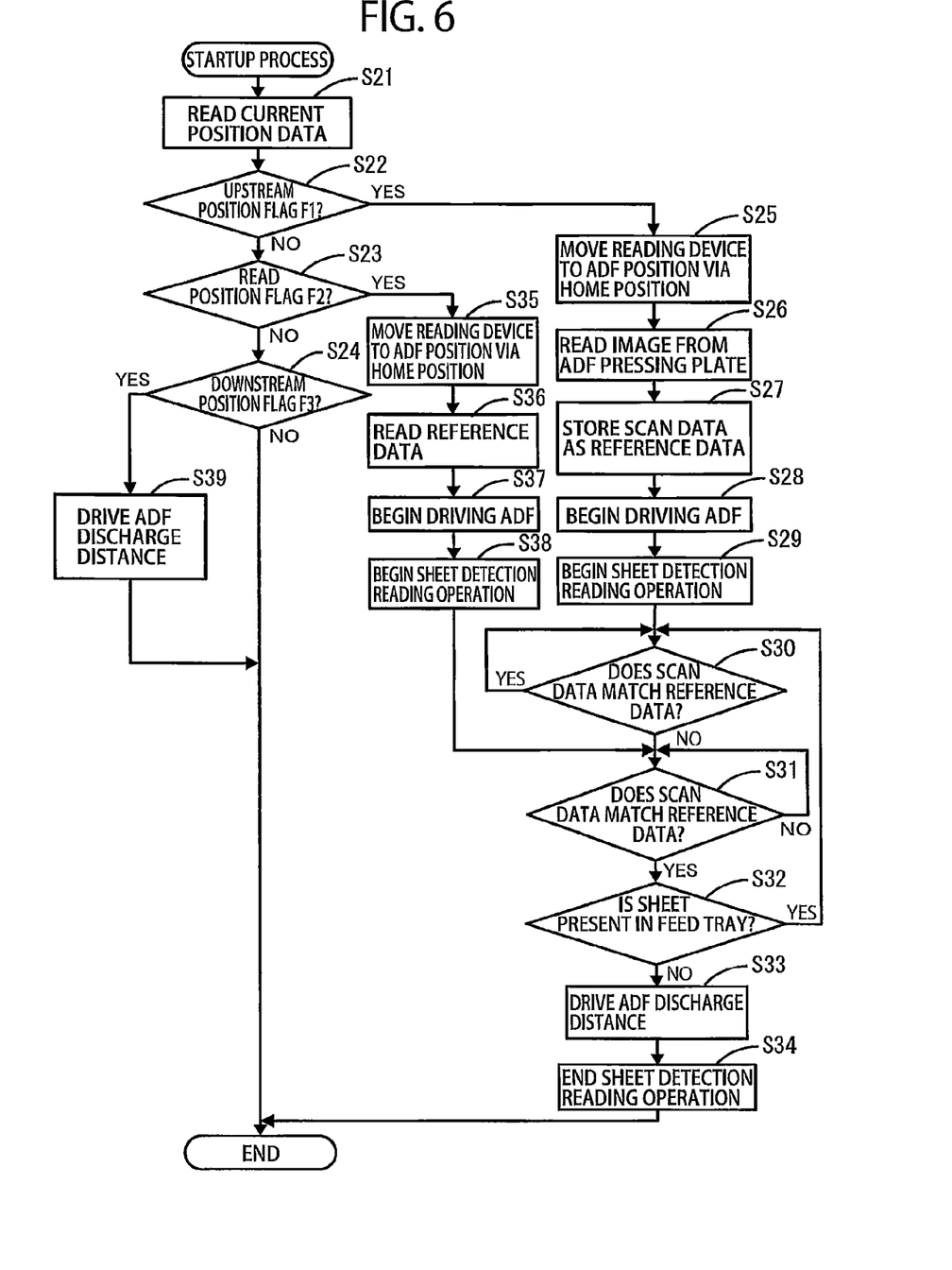
FIG. 6 is a flowchart illustrating steps in a startup process.

The control unit 27 executes the startup process shown in FIG. 6 when the user switches the power switch 23 off and then back on or when the user restarts the multifunction peripheral 1 while the power switch 23 is in an on state, for example. When the control unit 27 determines that the multifunction peripheral 1 has been started, the control unit 27 performs the startup process for driving the ADF 14 a conveying distance sufficient for discharging the current sheet M in the conveying path R based on the position data. In the startup process, the more downstream the conveyed position of the sheet M is in the conveying path, the shorter the conveying distance of the driving of the ADF 14 is. Here, the control unit 27 determines that the multifunction peripheral 1 has been started up when electricity begins to be supplied to the CPU 27A, for example.

In S21 of FIG. 6, the CPU 27A reads the current position data from the nonvolatile memory 28. In steps S22, S23, and S24, the control unit 27 determines whether the current position data corresponds to one of the flags F1 through F4 described earlier. In this way, the control unit 27 can identify the current position of the sheet M on the conveying path R.

(1) When the Current Position Data is the Upstream Position Flag F1

The current position data is the upstream position flag F1 when the user switches off the power switch 23, for example, while the sheet M is positioned upstream of the read position R1, as represented by the sheet M1 in FIG. 5. When the control unit 27 determines that the current position data is the upstream position flag F1 (S22: YES), in S25 the CPU 27A controls the device-moving mechanism 26B to move the reading device 26A temporarily to the home position X0 and then back to the ADF position X1.

In S26 the CPU 27A controls the reading device 26A to read an image from the opposing surface of the ADF pressing plate 15 in order to acquire scan data, and in S27 stores this scan data in the nonvolatile memory 28 as the reference data. By updating the reference data to scan data received prior to the sheet M reaching the read position in this way, the control unit 27 minimizes any decline in precision for determining whether scan data matches the reference data that could occur if the reference data were not updated, due to such factors as ambient conditions and changes in reading properties of the reading device 26A over time.

Once the reference data has been stored in the nonvolatile memory 28, in S28 the CPU 27A begins driving the ADF 14, thereby resuming conveyance of the sheet M positioned upstream of the read position R1. In S29 the control unit 27 begins the sheet detection reading operation and in S30 determines whether the scan data no longer matches the reference data. When the determination results change from indicating the scan data matches the reference data to indicating the scan data does not match the reference data (S30: NO), the control unit 27 performs the same determination to detect when the scan data again matches the reference data. When the scan data subsequently matches the reference data (S31: YES), in S32 the control unit 27 determines whether another sheet M is present in the feed tray 11 based on detection results received from the front sensor 12.

Note that when the control unit 27 determines in S30 that the scan data no longer matches the reference data, the control unit 27 may store the read position flag F2 in the nonvolatile memory 28 as the current position data. Further, when the control unit 27 determines in S31 that the scan data once again matches the reference data, the control unit 27 may store the downstream position flag F3 in the nonvolatile memory 28 as the current position data. In this way, data indicating the current position of the sheet M is regularly updated in the nonvolatile memory 28 during the startup process.

If the control unit 27 determines that a sheet M is present in the feed tray 11 (S32: YES), the control unit 27 returns to S30 to track the next sheet M positioned between the detection position R0 and read position R1. However, if the control unit 27 determines that another sheet M is not present in the feed tray 11 (S32: NO), in S33 the control unit 27 drives the ADF 14 to rotate exactly the discharge distance and subsequently halts the ADF 14, as described in S14 and S15 of FIG. 4, and then ends the current sheet detection reading operation in S34, thereby ending the current startup process.

(2) When the Current Position Data is the Read Position Flag F2

The current position data is the read position flag F2 when the user switches off the power switch 23, for example, while the sheet M is present at the read position R1, as is represented by the sheet M2 in FIG. 5. Therefore, when the control unit 27 determines that the current position data is the read position flag F2 (S22: NO, S23: YES), in S35 the CPU 27A controls the device-moving mechanism 26B to temporarily move the reading device 26A to the home position X0 and to subsequently move the reading device 26A to the ADF position X1.

Since the sheet M is present at the read position R1 in this case, the reading device 26A is unable to read an image from the opposing surface of the ADF pressing plate 15. Therefore, in S36 the control unit 27 reads the reference data that was previously stored in the nonvolatile memory 28 in S3 of the read control process. In this way, the control unit 27 minimizes any decline in precision for determining whether scan data matches the reference data that could occur due to such factors as ambient conditions and changes in reading properties of the reading device 26A over time, even when the sheet M is present at the read position R1.

In S37 the control unit 27 begins driving the ADF 14, thereby resuming conveyance of the sheet M present at the read position R1. In S38 the control unit 27 begins the sheet detection reading operation using the reference data read in S36 and advances to S31 described above. Thus, whether the sheet M is present at the read position R1 or at a position upstream of the read position R1, the control unit 27 can halt the ADF 14 after driving the ADF 14 the discharge distance from the point that the scan data received from the reading device 26A changes from not matching the reference data to matching the reference data. Accordingly, if the sheet M is present at the read position R1 or on the upstream side of the read position R1 when the multifunction peripheral 1 is started up, the control unit 27 can reduce the amount that the ADF 14 is driven more the closer the position of the sheet M to the read position R1.

(3) When the Current Position Data is the Downstream Position Flag F3

The current position data is the downstream position flag F3 when the user switches off the power switch 23, for example, while the sheet M is positioned downstream of the read position R1, as is represented by the sheet M3 in FIG. 5. In this case, it is not necessary to execute the sheet detection reading operation (S29 and S38). Therefore, when the control unit 27 determines that the current position data is the downstream position flag F3 (S22: NO, S23: NO, and S24: YES), in S39 the control unit 27 drives the ADF 14 the discharge distance and subsequently halts the ADF 14, without controlling movement of the reading device 26A (S25 and S35). Subsequently, the control unit 27 ends the current startup process. This method eliminates the unnecessary operation of moving the reading device 26A when it is not necessary to perform the sheet detection reading operation.

(4) When the Current Position Data is the Discharge Position Flag F4

The current position data is the discharge position flag F4 when the user switches off the power switch 23, for example, after the sheet M has been discharged onto the discharge tray 13, as is represented by the sheet M4 in FIG. 5. When the control unit 27 determines that the current position data is the discharge position flag F4 (S22: NO, S23: NO, and S24: NO), the control unit 27 simply ends the current startup process without performing operations to control movement of the reading device 26A (S25 and S35) and to control driving of the ADF 14 (S28 and S37). This method eliminates the unnecessary operations of driving the ADF 14 and the like when the sheet M has already been discharged onto the discharge tray 13.

Effects of the Embodiment

In the preferred embodiment described above, position data representing the current position of the sheet M on the conveying path R is regularly stored in the nonvolatile memory 28 as the sheet M is conveyed. When the control unit 27 determines that the multifunction peripheral 1 has been started up, the control unit 27 determines the current position of the sheet M based on the stored position data, and drives the ADF 14 to convey the sheet M a distance that is shorter the further downstream the position of the sheet M on the conveying path R. This method reduces the amount that the ADF 14 is unnecessarily driven in comparison to a device that always drives the ADF 14 the maximum distance from the detection position R0 to the discharge position R2 when the multifunction peripheral 1 is started up.

Further, the control unit 27 detects the current position of the sheet M by determining whether scan data outputted from the reading device 26A matches the reference data as the sheet M is being conveyed (S7 and S10 in FIG. 4) and stores position data indicating the current position of the sheet M in the nonvolatile memory 28 each time the position is detected. In this way, the control unit 27 can store position data in the nonvolatile memory 28 indicating the current position of the sheet M based on scan data outputted from the reading device 26A.

The sheet-conveying device of the present invention is not limited to the multifunction peripheral 1 in the embodiment, but may be a device that conveys sheets other than sheets M of originals, such as a printing device that conveys printing sheets or a currency-conveying device that conveys currency. The sheet-conveying device may also be a device not provided with an image-reading unit 26 or similar image-processing device.

The image-processing device of the present invention is not limited to the multifunction peripheral 1, but may be a standalone scanner having only a scanning function, a printer having only a printing function, a facsimile machine, a copy machine, and the like.

The conveying path in the sheet-conveying device of the present invention is not limited to the shape of the conveying path R described in the embodiment, but may be configured of only straight sections without a U-shaped section.

The image-processing unit of the image-processing device according to the invention is not limited to the image-reading unit 26, but may be a printing unit for performing printing operations on sheets, or another processing unit for performing processes such as stapling sheets together.

In the preferred embodiment, the control unit 27 is configured of the CPU 27A and hardware circuits such as the image-processing unit 27D for implementing the read control process and the startup process. However, the control unit 27 may implement the read control process and the like with only one or a plurality of CPUs or with only a hardware circuit, such as an application-specific integrated circuit (ASIC). Further, the image-processing unit 27D may be used to implement the position storing process, position detecting process, reference data storing process, and the like described above.

The control unit 27 may also execute the reference data storing process (S2 and S3) in between the step to start driving of the ADF 14 (S4) and the step to start reading of the sheet (S6), or after the step to stop reading of the sheet (S11). However, by executing the reference data storing process prior to the step to start driving of the ADF 14, as described in the embodiment, the control unit 27 can reliably store reference data and can perform the determinations in S7, S10, and the like using the latest reference data.

The position storing process may also be performed without using scan data from the reading device 26A. For example, the multifunction peripheral 1 may be provided with a sensor (such as the rear sensor 30 shown in FIGS. 2 and 3) for detecting the sheet M being conveyed along the conveying path R, and the control unit 27 may detect the current position of the sheet M on the conveying path R based on these detection results. Alternatively, the control unit 27 may regularly store the elapsed time from the moment that the sheet M was initially conveyed or the number of steps by which the motor drive circuit 14H drives the stepping motor 14G from the same point in nonvolatile memory as the position data.

While the invention has been described in detail with reference to the embodiment thereof, it would be apparent to those skilled in the art that various changes and modifications may be made therein without departing from the spirit of the invention.

What is claimed is:

1. An image processing device comprising:
a feed tray;
a discharge tray disposed at a discharge position;
a conveying unit configured to drive a roller provided along a conveying path from the feed tray to the discharge tray;
an image processing unit configured to read an image at a read position and output scan data;
an opposing member that opposes the image processing unit across the conveying path at the read position;
a nonvolatile memory configured to store position data during conveyance of a sheet along the conveying path, the position data indicative of a conveyed position of the sheet, the conveyed position being one of an upstream position upstream of the read position, the read position, a downstream position downstream of the read position and the discharge position; and
a controller configured to:
determine the conveyed position based on the position data when the controller is powered after not being powered;
control, in response to determining that the conveying position is the upstream position, the image processing unit to read an image of the opposing member and output reference data, and control both the conveying unit to drive the roller and the image processing unit to read an image and output scan data;
store the reference data in the nonvolatile memory during the conveyance of the sheet;
determine, whether or not the scan data matches the stored reference data and when the scan data matches the reference data after the scan data does not match the reference data, control the conveying unit to drive the roller a discharge distance from the read position to the discharge position; and
control, in response to determining that the conveyed position is the downstream position, the conveying unit to drive the roller a discharge distance from the read position to the discharge position.

2. The image processing device according to claim 1, wherein the controller determines that the conveyed position of the sheet is the read position if the scan data does not match the reference data.

3. The image processing device according to claim 2, wherein the controller is further configured to:
update the position data in the nonvolatile memory to position data indicative of the discharge position when the conveying unit is controlled to drive the roller the discharge distance.

4. The image processing device according to claim 1, further comprising:
a platen configured to load a sheet; and
a moving unit configured to move the image processing unit between a first opposing position, a home position and a second opposing position, the moving unit opposing the opposing member at the first opposing position, the moving unit opposing the platen at the second opposing position,
wherein the controller is further configured to:
control, when the controller is powered, after not being power, the moving unit to move the image processing unit from the home position to the first opposing position if the position data is indicative of either one of the read position and the upstream position, and stay the image processing unit at the home position if the position data is not indicative of either one of the read position and the upstream position.

5. The image processing device according to claim 1, wherein the controller is further configured to:
control, in response to determining that the conveyed position is the discharge position, the conveying unit not to drive the roller.

6. The image processing device according to claim 2, wherein the controller is further configured to:
control, in response to determining that the conveyed position is the read position, both the conveying unit to drive the roller and the image processing unit to read an image and output scan data and when the scan data matches the reference data stored in the nonvolatile memory, control the conveying unit to drive the roller a discharge distance from the read position to the discharge position.

7. The image processing device according to claim 1, wherein the controller is further configured to:
- control, when image processing for a sheet is started after the controller is powered, the image processing unit to read an image of the opposing member and output reference data, and both the conveying unit to drive the roller and the image processing unit to read an image and output scan data;
- control the image processing unit to output the scan data as an original image after the scan data does not match the reference data and after then scan data matches the reference data, control both the image processing unit to stop the image processing for the sheet and the conveying unit to drive the roller a discharge distance from the read position to the discharge position; and
- store position data indicative of the upstream position in the nonvolatile memory after the conveying unit starts to drive the roller, store position data indicative of the read position in the nonvolatile member after the scan data does not match the reference data and store position data indicative of the downstream position in the nonvolatile memory after the scan data matches the reference data subsequent to not matching, and stores position data indicative of the discharge position in nonvolatile memory after the conveying unit drives the roller the discharge distance.

* * * * *